Figure 3:
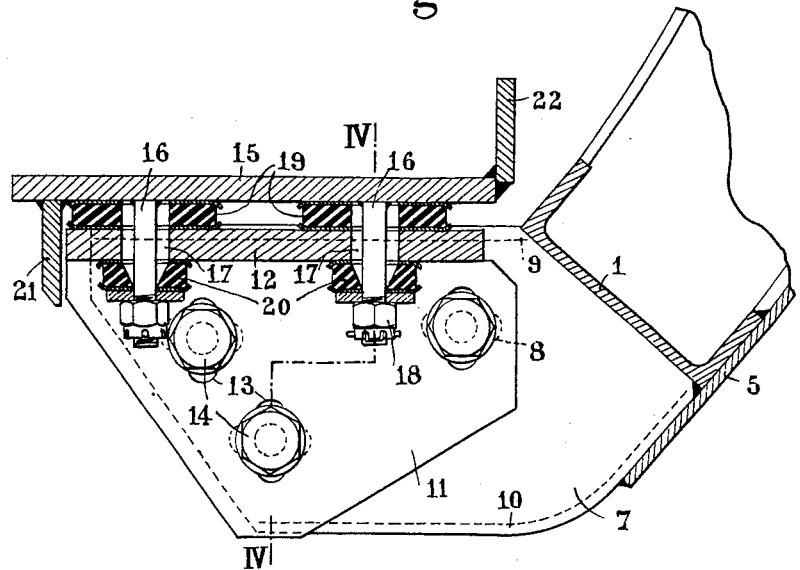

Oct. 23, 1962 L. CHADENSON 3,059,588
TUBULAR BEAM FOR OVERHEAD VEHICLE TRACK
Filed Oct. 17, 1961 2 Sheets-Sheet 1
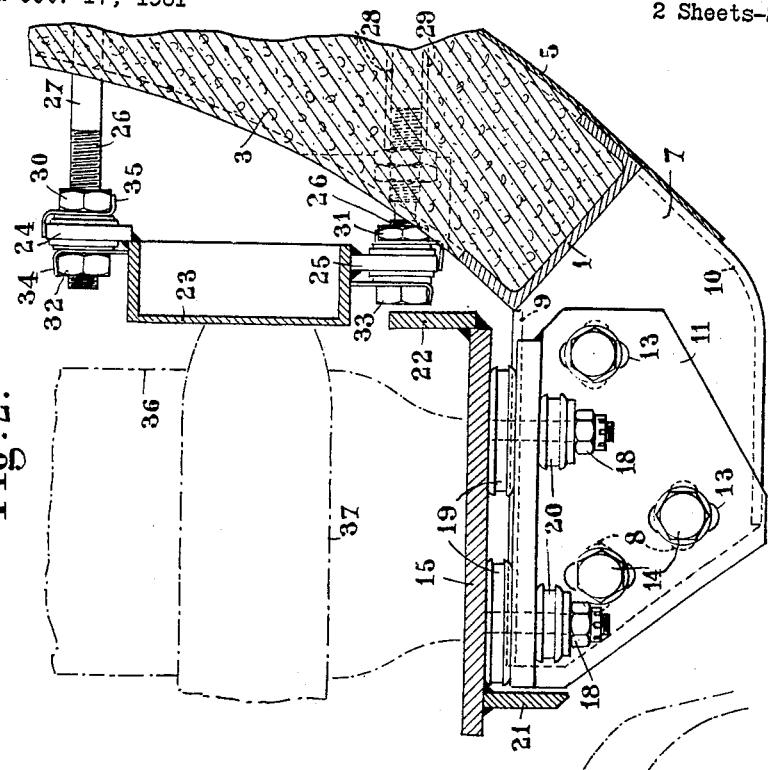

United States Patent Office 3,059,588
Patented Oct. 23, 1962

3,059,588
TUBULAR BEAM FOR OVERHEAD VEHICLE TRACK
Lucien Chadenson, Paris, France, assignor to Safege-Transport, Societe Anonyme, Paris, France
Filed Oct. 17, 1961, Ser. No. 145,555
Claims priority, application France July 20, 1961
4 Claims. (Cl. 104—94)

The present invention relates in general to overhead railways of the type comprising an overhead track from which suitable vehicles are suspended, and has specific reference to improvements in the tubular beams utilized for constructing overhead railway tracks, these beams being formed along the lowermost generatrix with a longitudinal slot through which extend elements of the system for suspending the vehicle from the bogies or trolleys having wheels rolling on adequate runways carried by the tubular beam on either side of its lower slot, said bogies being also maintained on said runways by lateral guideways, each guideway being associated with, and disposed on the inner side in relation to, the relevant runway.

The carrier bogies are mounted on wheels equipped with tires, these wheels having a normally horizontal axis and rolling on said runways, other wheels also equipped with tires but having a normally vertical axis being kept in rolling engagement with the corresponding guideway.

Various propositions have already been made with a view to facilitate the mounting and adjustment of these runways and guideways; thus, it has already been proposed to use as runways and guideways some of the main longitudinal elements of the tubular beam, a rather attractive solution as far as the utilization of the resistance of materials is concerned, but difficult to embody from the dual point of view of construction and adjustment; it has also been proposed to combine each runway with the conjugate guideway, notably by utilizing an angle section of which the horizontal flange constitutes the runway and the vertical web the guideway, but this solution too did not prove satisfactory.

The tubular beam for overhead vehicle tracks according to this invention is characterized in that there are disposed at spaced intervals on either side of the longitudinal slot formed in the lower portion of this beam, through which extend the vehicle suspension members, vertical and transverse metal plates rigid with the tubular beam, which will be called hereinafter "diaphragm plates," on which are secured for adjustment in all directions, in their plane, other vertical and transverse plates termed hereinafter "L-plates" because they comprise at their upper portion a small perpendicular lip acting as a support to the runway proper formed in turn with a down-turned flange on the inner side and with an up-turned flange on the outer side in order to impart to the runway the necessary resistance to bending stress.

The runway is secured on the perpendicular lip of the so-called L-plates, preferably with the interposition of rubber or like pads to avoid any metal-to-metal contact and the L-plates themselves are secured on said diaphragms after an adjustment intended to ensure a perfect relative alignment of the runways; the fastening is advantageously accomplished by means of three bolts engaging corresponding elongated apertures having different directions in the L-plates and in the diaphragms, in order to permit a displacement of said plates in all directions (in their plane) in relation to the relevant diaphragm.

The guideways are secured on the side walls of the tubular beams and internally thereof, above and inside the relevant runways; these guideways may consist of U-sections having their webs disposed vertically to constitute the guiding surface and their flanges directed outwardly; transverse and horizontal bolts or studs embedded in the beam wall are formed with screw-threaded shanks projecting into the inner space of the tubular beam to permit the adjustment and fastening of the guideways.

Figure 4:
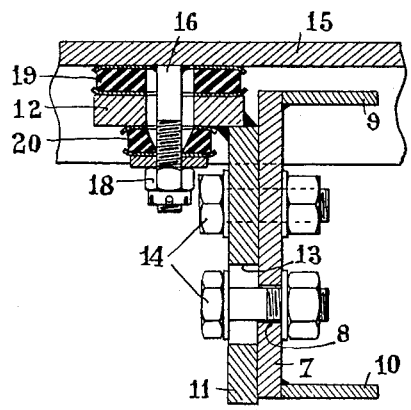

In order to afford a clearer understanding of this invention and of the manner in which the same may be carried out in practice, reference will now be made to the accompanying drawings illustrating diagrammatically by way of example a typical embodiment of the runway and guideway structure of this invention. In the drawings:

FIGURE 1 is a vertical cross-section,
FIGURE 2 is a fragmentary section taken on a larger scale,
FIGURE 3 is a similar fragmentary section of the structure according to this invention; and
FIGURE 4 is a fragmentary vertical longitudinal section showing more particularly the diaphragm plate and L-plate assembly.

The tubular beam illustrated in the drawings comprises a metal frame structure 1, with concrete fillings 2, 3 and 4 co-acting with the frame structure 1, and an external casing 5. Preferably, a sound-damping inner lining 6 is provided. Furthermore, at spaced intervals, for example of the order of three feet, transverse and vertical diaphragm plates 7, rigid with the frame structure 1, are provided. Each diaphragm plate has three elongated horizontal holes 8 formed therethrough, and comprises perpendicular flanges 9, 10 along its top and bottom edges, as shown in FIG. 4.

On these diaphragm plates are adapted to be secured L-plates 11 having a perpendicular lip or flange 12; each L-plate has formed therein three elongated holes 13 corresponding to the holes 8 of diaphragm plates 7 but differing therefrom in that they extend vertically instead of horizontally; with this arrangement, the position of the L-plates can be adjusted with a considerable degree of precision in both horizontal and vertical directions in relation to the diaphragm plate, so that the position of the flanges 12 of plates 11 can be set with the desired accuracy, whereafter bolts 14 extending through the corresponding holes 8, 13 are tightened.

The runways proper 15 are secured on the flanges 12 of plates 11 by means of bolt shanks 16 extending through holes 17 formed in the flanges 12 but without contacting the walls of these holes, and receiving nuts 18 with the inter-position of rubber pads or silentblocs 19, 20; thus, any metal-to-metal contact and therefore any transmission or detrimental vibration is safely avoided.

The runway plates 15 are reinforced by a down-turned inner flange or lip 21 and by an up-turned outer flange or lip 22, as shown.

The guideways proper consist of U-section elements 23 formed with additional upper and lower flanges or lips 24, 25 receiving through adequate holes the screw-threaded shanks 26 of bolts 27, 28 sealed or embedded in the lateral concrete fillings 2, 3, or screwed in tapped tubular members 29 embedded in turn in the concrete fillings; the adjustment is obtained by means of bearing nuts 30, 31 and clamping nuts 32, 33 which are prevented from rotating after the adjustment operation by any suitable means such as lock washers 34, 35.

Rubber damping pads or like devices, for example silentblocs, may be provided to avoid any direct metal-to-metal contact.

The bogie rolling wheels 36 having a horizontal axis (shown only in chain-dotted contours in FIGS. 1 and 2) and the bogie guide wheels 37 having a vertical axis, carry the vehicle 38 through the medium of a suspension system comprising levers 39, these wheels engaging the runways 15 and guideways 23 respectively, as shown.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A tubular beam for constituting the track of overhead vehicles, which comprises a metal frame structure formed with a continuous longitudinal slot in its lower portion for the passage of the vehicle suspension members, wherein vertical and transverse metal diaphragm plates rigid with the frame structure of said tubular beam are disposed at spaced intervals on either side of said slot, other vertical L-plates, being formed at their upper portion with a perpendicular flange and comprising means for securing said L-plates on said diaphragm plates, and a pair of runways proper, each formed with a downturned flange on the inner side and an up-turned flange on the outer side to resist bending stress, which are carried on either side of said slot by said L-plates.

2. A tubular beam as set forth in claim 1, wherein said runways are secured on the perpendicular flanges of said L-plates, the assembly further comprising rubber pads interposed between said runways and said L-plates to avoid any detrimental metal-to-metal contact.

3. A tubular beam as set forth in claim 2, wherein said L-plates are secured on said diaphragm plates by means of three bolts engaging elongated registering holes formed in said diaphragm plates and L-plates but in different directions to permit the displacement of said L-plates in all directions in their plane in relation to the corresponding diaphragm plates.

4. A tubular beam as set forth in claim 1, wherein guideways are secured on the lateral walls of, and inside, said tubular beam, above and externally of the said runways.

References Cited in the file of this patent

UNITED STATES PATENTS

| | | |
|---|---|---|
| 916,531 | Carr | Mar. 30, 1909 |
| 2,825,291 | Chadenson | Mar. 4, 1958 |